Feb. 24, 1970 J. J. LORDITCH, JR 3,497,725

MONOSTABLE MULTIVIBRATOR

Filed June 7, 1966 2 Sheets-Sheet 1

INVENTOR

JOSEPH J. LORDITCH, Jr.

BY

ATTORNEY

MONOSTABLE MULTIVIBRATOR

Filed June 7, 1966 2 Sheets-Sheet 2

INVENTOR
JOSEPH J. LORDITCH, Jr.

United States Patent Office 3,497,725
Patented Feb. 24, 1970

3,497,725

MONOSTABLE MULTIVIBRATOR

Joseph J. Lorditch, Jr., Beltsville, Md., assignor to the United States of America, as represented by the Secretary of the Navy Filed June 7, 1966, Ser. No. 557,341
Int. Cl. H03k *3/10, 3/335*
U.S. Cl. 307—273 4 Claims

ABSTRACT OF THE DISCLOSURE

A monostable multivibrator which includes a source of synchronizing pulses connected to and setting a bistable multivibrator into a first condition whereupon the bistable multivibrator charges a capacitor which, in turn, is connected to the emitter of a unijunction transistor. One base of the unijunction transistor is connected to a control voltage source so as to develop a voltage signal at the other base which serves to reset the bistable multivibrator when the voltage across the capacitor exceeds a fraction of the control voltage. Thus, the output waveshape from the bistable multivibrator will be a pulse whose duration is linearly controlled by linear changes in the control voltage.

This invention relates generally to multivibrator circuits and more particularly to an improved monostable multivibrator having a linear voltage controlled output.

Monostable multivibrators of the type having one normally stable state and one quasi-stable state have been used to obtain an output pulse of predetermined width. In a typical one of these circuits, the time duration of the pulse is determined by the time duration that the multivibrator remains in its quasi-stable state. An input trigger signal induces transition from the stable state to the quasi-stable state in which state the multivibrator remains for a time delay period. It then returns to its stable state with no external signal being required. However, a need evolved for a means of providing a pulse signal where the pulse width varied linearly with an applied control voltage. It was in response to this need that the present invention was developed.

Accordingly, an object of the present invention is to provide a monostable multivibrator wherein the time of duration of the output pulse (quasi-stable state) can be linearly controlled in response to an applied voltage.

Another object of this invention is to provide a linear voltage controlled monostable multivibrator capable of additionally generating a sawtooth signal.

A further object of the instant invention is to provide a monostable multivibrator having a linear voltage controlled pulse output and positive and negative pluse outputs occurring at the termination of said linear voltage controlled pulse output.

A still further object of the instant invention is to provide a relatively simple, efficient and inexpensive linear voltage controlled monostable multivibrator.

In accordance with one embodiment of the present invention a synchrodyne is connected to one of the inputs of a bistable multivibrator for providing triggering pulses thereto. One of the outputs of said bistable multivibrator is serially connected through a diode and an RC network to ground, and at the junction of said RC network there is connected the emitter of a unijunction transistor. A first base of said unijunction transistor is connected through a resistor to ground, and also to a second input of said bistable mutlivibrator for providing reset pulses thereto. A second base of said unijunction transistor is connected through a resistor to a well-known control voltage source which may commonly provide a programmed time variable output voltage.

Basically, a pulse from said synchrodyne will cause said bistable multivibrator to change state and provide a signal through said diode to said RC network. The capacitor of said RC network will linearly charge until the signal thereacross reaches a predetermined fraction of the signal from said control voltage source, at which time said unijunction transistor will fire.

Upon the firing of said unijunction transistor a positive pulse will be fed back from said first base to said bistable multivibrator causing it to reset by changing its output state, the input signal to said diode will drop to zero, said capacitor will rapidly discharge, and a negative pulse will appear at said second base. Thus, the input signal to said diode will be a pulse whose duration varies linearly with the voltage from said control voltage source and the signal across said capacitor will be a sawtooth wave shape.

In another embodiment of the instant invention the bistable multivibrator may be replaced with a silicon controlled rectifier and the resistor of the RC network may be replaced with a constant current source to improve linearity.

The attendant advantages of this invention will be better appreciated and said invention will become clearly understood by reference to the following detailed description when considered in conjunction with the accompanying drawings, illustrating four embodiments of the instant invention, wherein.

Figure 1:
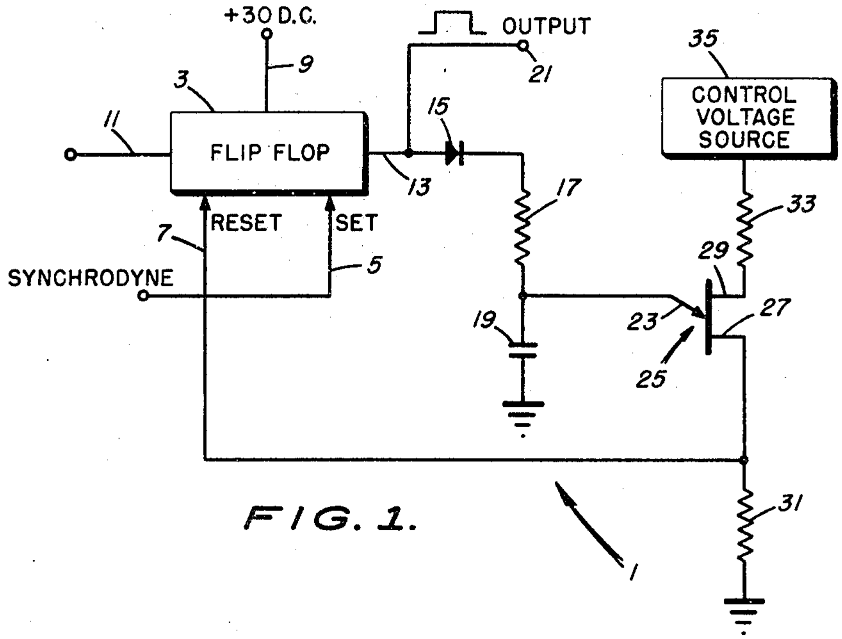
FIG. 1 is a simplified schematic of a first embodiment of the instant invention.

Referring to the drawings in more detail, and more specifically to FIG. 1, the invention is shown generally at 1 including a bistable multivibrator (flip flop) 3, having inputs 5, 7 and 9, and outputs 11 and 13. The output 13 is serially connected through a diode 15, a resistor 17, and a capacitor 19 to ground, and an output terminal 21 is connected in electrical parallelism with the anode of the diode 15.

The emitter 23 of a conjunction transistor 25, such as a common 2N494 transistor, is connected in electrical parallelism with capacitor 19. The bases 27 and 29 of said transistor 25 are connected through a resistor 31 to ground and a resistor 33 to a well-konwn D.C. control voltage source 35, respectively. Power is supplied to the bistable multivibrator 3 by a 30 volt D.C. power supply (not shown) through the input 9.

Considering the operation of the circuit in greater detail, the bistable multivibrator 3 is initially in a state such that there is a signal at the output 11. A synchrodyne (not shown) provides a triggering pulse to the input 5 which causes the bistable multivibrator 3 to change state and thereby create a signal at the output 13. This signal will appear at the terminal 21 as a sharp rise followed by a steady potential while the signal passes through the diode 15 and the resistor 17 and is charging the capacitor 19.

It will be recalled that a D.C. signal is being supplied to the base 29 of the unijunction transistor 25 by the control voltage source 35. Additionally, the emitter 23 of said transistor 25 is connected to one side of the capacitor 19 and will therefore receive the signal thereacross. Consequently, when the signal across the capacitor 19 reaches a prescribed fraction of the signal from the control voltage source 35 it will cause the unijunction transistor 25 to fire.

When the transistor 25 fires the capacitor 19 will discharge to ground through the resistor 31 causing a pulse to appear thereacross. This pulse will be fed back to the input 7 of the bistable multivibrator 3 causing it to change state, whereupon the signal at the terminal 21 will sharply fall to zero. Thus, the signal output at the terminal 21 will be a pulse whose duration will vary linearly with the magnitude of the signal from the source 35.

By making the resistor 17 of substantially greater value than the resistor 31 the time constant for charging said capacitor 19 will be substantially larger than the discharge time constant. Therefore, the signal across the capacitor 19 will rise gradually, fall sharply, and appear as a linear sawtooth wave shape. This sawtooth signal may be tapped at the junction of the emitter 23 and capacitor 19. An additional signal output in the form of a negative pulse is available by tapping the base 29 resistor 33 junction.

It should be emphasized at this point that the D.C. signal output of the voltage control source 35 may either be a steady signal or one whose amplitude varies with time. In the case of a time varying amplitude signal from the source 35 it can readily be seen that such a signal may be programmed to provide a desired varying pulse width output at the terminal 21.

Figure 2:
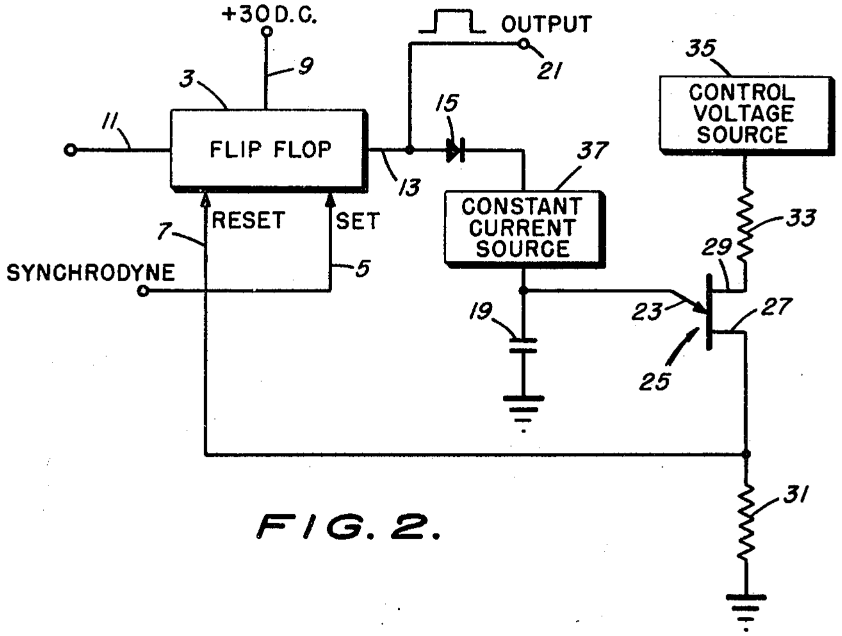
FIG. 2 is a simplified schematic of a second embodiment of the instant invention.

Obviously, the linearity of the embodiment of FIG. 1 is dependent upon the resistor 17 capacitor 19 charging rate. However, because only a small fraction of the full charge time is used, the linearity of operation of this particular embodiment is about two percent. In order to obtain greater linearity the embodiment of FIG. 2 can be utilized. Referring in more detail to FIG. 2, it can be seen that the resistor 17 (FIG. 1) has been replaced with a constant current source 37. The operation of this embodiment is essentially the same as that of FIG. 1 with the exception of a more linear control of the signal output from terminal 21 by virtue of the constant current source 37.

Referring again to FIG. 3, the embodiment shown is essentially that of FIG. 1 with a few changes. The bistable multivibrator 3 (FIG. 1) is replaced with a silicon controlled rectifier 39, coupling capacitors 41 and 43 are serially connected to the inputs 5 and 7, respectively, power is supplied to said rectifier 39 through a resistor 45, and a Zener diode 47 is connected between the input 5 and ground. The Zener diode 47 serves to control the pulse height at the output terminal 21. Additionally, negative synchrodyne pulses are utilized to trigger the rectifier 39 and therefore the diode 15 is connected between the input 5 and the output terminal 21 to prevent said negative pulses from reflecting in the output signal.

It should be noted that coupling capacitors such as 41 and 43 (shown in FIGS. 3 and 4) would normally be utilized in the embodiments of FIGS. 1 and 2. Additionally, the Zener diode 47 of FIGS. 3 and 4 could be eliminated if a regulated power supply were utilized for the silicon controlled rectifier 39.

Figure 3:
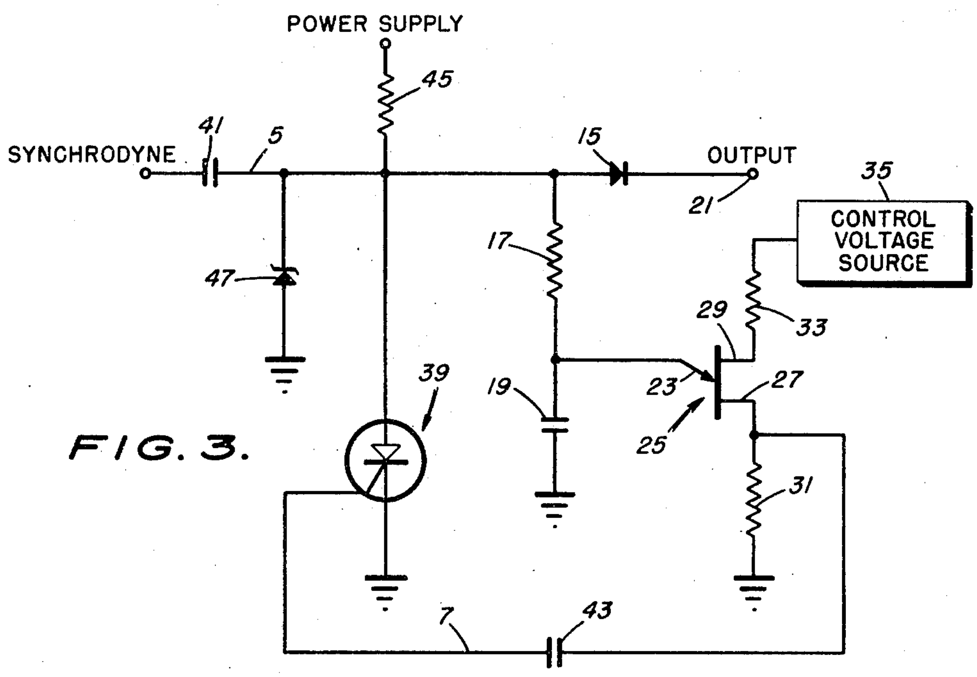
FIG. 3 is a simplified schematic of a third embodiment of the instant invention.
Figure 4:
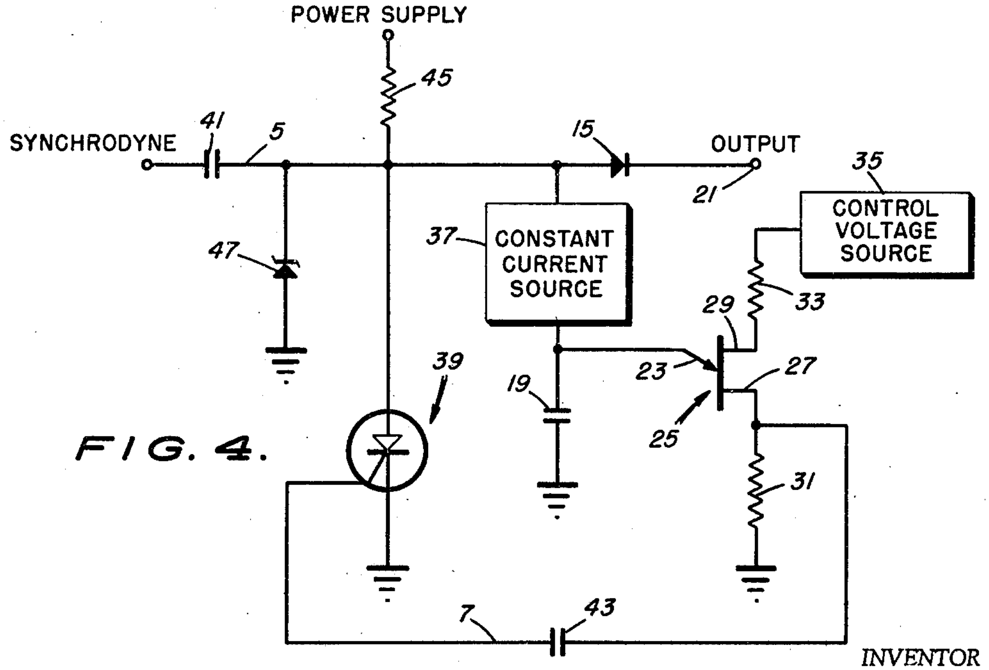
FIG. 4 is a simplified schematic of a fourth embodiment of the instant invention.

The operation of the embodiment of FIG. 3 is essentially the same as that of FIG. 1. A negative going pulse, e.g., from a synchrodyne (not shown), is used to initiate operation of the network. In the quiescent state of the network the silicon controlled rectifier 39 is conducting and the signal level at the output terminal 21 is very nearly zero. When the negative pulse is fed to the input 5 the silicon controlled rectifier 39 is cut-off and the signal at the output terminal 21 quickly rises toward the power supply voltage. The actual level reached by the output signal is set by the Zener diode 47.

When the silicon controlled rectifier 39 is cut-off the capacitor 19 will charge until the signal across it reaches a level predetermined by the D.C. signal from the voltage control source 35, at which time the unijunction transistor 25 will fire. When the transistor 25 fires the capacitor 19 will discharge through the resistor 31 to ground, and generate a pulse which is fed back to the input 7 of said rectifier 39. This feedback pulse will cause the silicon controlled rectifier 39 to conduct and clamp the output terminal at nearly zero.

Referring again to FIG. 4, the embodiment of FIG. 3 is modified by substituting a constant current source for the resistor 17 to provide greater linearity. The embodiment of FIG. 4 operates in essentially the same manner as that of FIG. 3, and bears the same relationship thereto as does the embodiment of FIG. 2 to that of FIG. 1.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is therefore to be understood that within the scope of the appended claims the instant invention may be practised in a manner otherwise than is specifically described herein.

What is claimed is:

1. A monostable multivibrator comprising:
bistable circuit means capable of producing a first D.C. output voltage level when in its first operating state and a second D.C. output voltage level when in its second operating state,
a series resistor-capacitor network serially connected to the output of said bistable circuit means, said capacitor being linearly charged when said bistable circuit means is in its first operating state,
an external source of trigger pulses operably connected to said bistable circuit means for triggering said bistable circuit means to said first operating state,
a source of variable amplitude control voltage, and
a unijunction transistor having first and second bases and an emitter, said first base being connected to said variable amplitude control voltage source and said second base being connected to said bistable circuit means, and said emitter being connected to said capacitor such that said unijunction transistor is triggered when the voltage on said capacitor reaches a predetermined fraction of said variable amplitude control voltage,
whereby the output from said bistable circuit means is a pulse whose width varies linearly as a function of said variable amplitude control voltage.

2. The monostable multivibrator as specified in claim 1 wherein said bistable circuit means is a bistable multivibrator.

3. The monostable multivibrator as specified in claim 1 wherein said bistable circuit means is a silicon controlled rectifier.

4. The monostable multivibrator as specified in claim 1 further including means connected between the output of said bistable circuit means and said capacitor for charging said capacitor at a linear rate, the value of capacitor voltage effective to trigger said unijunction transistor occurring during the linear charging of said capacitor, whereby the width of the output pulse produced by said bistable circuit means varies linearly with said variable amplitude control voltage.

References Cited

UNITED STATES PATENTS

| | | | |
|---|---|---|---|
| 2,997,665 | 8/1961 | Sylvan | 307—283 |
| 3,048,708 | 8/1962 | Raver | 307—273 |
| 3,049,625 | 8/1962 | Brockman | 307—239 |
| 3,125,730 | 3/1964 | Levy | 307—265 |
| 3,259,854 | 7/1966 | Marcus | 307—228 |
| 3,293,449 | 12/1966 | Gutzwiller | 307—301 |
| 3,294,983 | 12/1966 | Draper | 307—271 |

OTHER REFERENCES

RCA Technical Note March 1965, Technical Note No. 620, "Long Delay Monostable Multivibrator."

Denis P. Dorsey "Monostable Multibrator," RCA Technical Note No. 658 November 1965.

JOHN S. HEYMAN, Primary Examiner

H. A. DIXON, Assistant Examiner

U.S. Cl. X.R.

307—283